Jan. 13, 1931.                    O. WENDT                    1,788,606
                            AGRICULTURAL IMPLEMENT
                        Filed Nov. 15, 1928      2 Sheets-Sheet 1
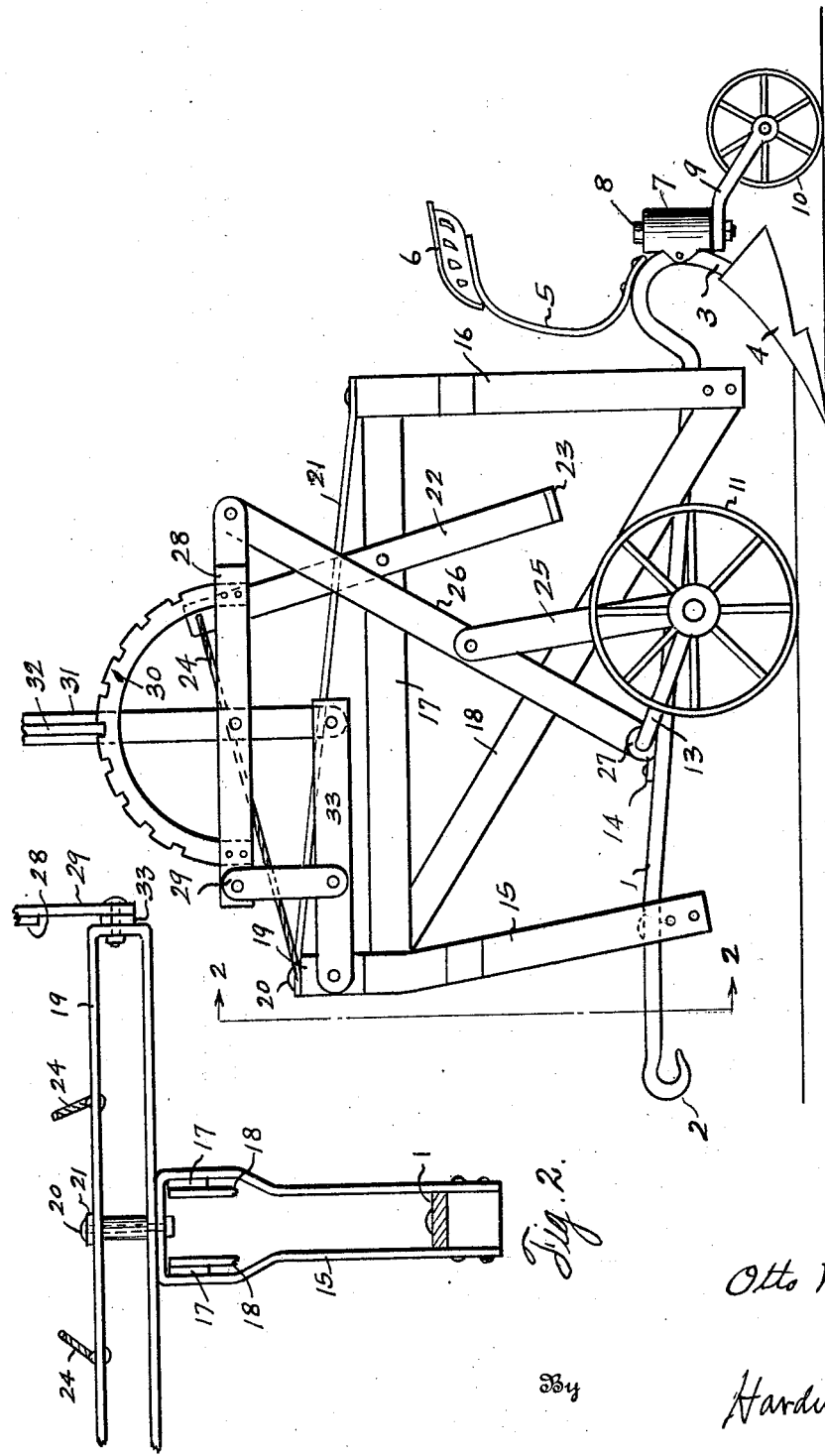
Inventor
Otto Wendt
By
Hardway Cathey
Attorneys

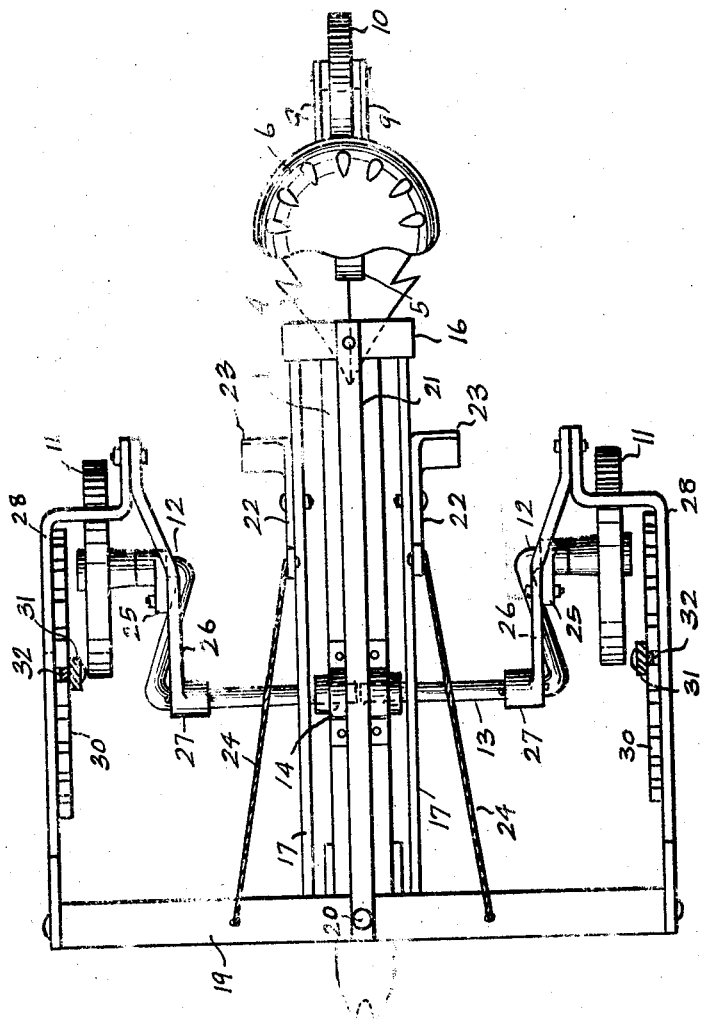

Patented Jan. 13, 1931

1,788,606

UNITED STATES PATENT OFFICE

OTTO WENDT, OF SHINER, TEXAS

AGRICULTURAL IMPLEMENT

Application filed November 15, 1928. Serial No. 319,684.

This invention relates to new and useful improvements in an agricultural implement.

One object of the invention is to provide a novel type of plow, adapted to be connected to a tractor and embodying a share and means through which the share may be guided and its depth regulated.

Another object of the invention is to provide an implement of the character described which is of very simple construction and which may be cheaply produced, easily operated and which is very efficient for the purpose intended.

With the above and other objects in view the invention has particular relation to certain novel features of construction, operation and arrangement of parts, an example of which is given in this specification and illustrated in the accompanying drawings wherein Figure 1 shows a side elevation of the implement.

Figure 2 shows a fragmentary sectional view taken on the line 2—2 of Figure 1, and Figure 3 shows a plan view partly in section.

Referring now more particularly to the drawings, wherein like numerals of reference designate similar parts in each of the figures, the numeral 1 designates the beam which is disposed substantially horizontally and whose forward end is formed with a hook 2 by means of which the implement may be attached to the rear end of a tractor. The rear end of the beam is of an arcuate formation with its free end downwardly curved forming a stock 3 to which the share 4 is attached. Attached to and upstanding from the stock there is a seat support 5 on which the seat 6 is mounted. Attached to and located behind the stock 3 there is a vertical bearing member 7 in the bearing of which there is the shank 8 disposed to turn on a vertical axis. Attached to the lower end of the shank are the rearwardly extending arms 9, 9 between which the castor wheel 10 is mounted to rotate. The implement has the ground wheels 11, 11. These wheels are mounted to rotate on the spindles 12, 12 of the axle 13 said axle being forwardly offset relative to said spindles and the beam 1 has a transverse bearing 14 through which said axle extends. There are the front and rear frame members 15, 16 of an inverted U-shaped form and the lower ends of whose arms embrace and are rigidly secured to the front and rear ends respectively of said beam. These frame members are secured together at the top by means of lengthwise side bars 17, 17 and by the diagonal brace bars 18, 18. The side bars 17 are rigidly secured to the corresponding side arms of the respective frame members 15 and 16 and the diagonal bars 18 are rigidly secured at their lower ends to the lower ends of the side arms of the rear frame member 16, and to the upper ends of the side arms of the frame member 15, as shown.

There is a guide lever 19 on the upper end of the front frame member 15 which is mounted to swing on a vertical axis by the linch pin 20. A stay bar 21 is permanently attached, at its rear end, to the upper end of the rear frame member 16 and at its forward end has a bearing through which the linch pin 20 works.

Pivoted to each side bar 17 there is control lever 22. The lower ends of these levers are outwardly turned forming the pedals 23 which serve as foot rests for the operator on the seat 6. The upper ends of the levers 22 are extended above the side bars 17 and the flexible cables 24 connect opposite ends of the guide lever 19 with the upper ends of the respective control levers 22. Upstanding from each spindle 12, and having a bearing on said spindle, there is a standard 25 and there are the lift levers 26, 26 whose lower ends have bearings 27, 27 on the axle 13. These lift levers have a pivotal connection with the upper ends of the corresponding standards 25, and are extended upwardly and their upper ends are pivotally connected to the rear ends of the corresponding rack bars 28. The rear ends of these rack bars are inwardly turned, as shown in Figure 3, and their forward ends are pivotally connected to the upper ends of the respective links 29, 29.

Fastened to each rack bar 28 there is an arcuate rack 30 and a manual lever 31 is pivotally connected to each rack bar 28 and is provided with the usual manually operable dog 32 adapted to engage the corresponding rack 30. The lower end of each lever 31 is extended beneath the corresponding bar 28 and links 33 are pivotally connected at the forward ends to each end of the guide lever 19, said links being also pivotally connected to the lower ends of the corresponding links 29 and levers 31.

When it is desired to regulate the depth of the share 4 the levers 31 may be pulled rearwardly by the operator. In order to do this the dogs 32 must be released from the racks 30, in the conventional manner. When said levers 31 are pulled rearwardly they will operate to carry the corresponding rack bars 28 rearwardly and downwardly thus swinging the lift levers 26 about their pivotal connections with the upper ends of the standards 25 and the axle 13 will thus be swung upwardly. The forward end of the beam 1 being attached to a stationary anchor this upward movement of the beam 1 will necessarily result in the elevation of the share 4. The dogs 32 may then be reengaged with the racks 30 and the share held at this point of elevation. Similarly the share may be lowered by moving the manual levers 31 forwardly.

It should be here stated that the axle 13 is formed of two sections, the inner ends of these respective sections fitting into the bearing 14 and being independently rotatable therein. In case it be desired to direct the point of the share laterally one of the pedals 23 may be forced forwardly and the other simultaneously released while the dogs 32 are in engagement with their respective racks 30.

This movement of said pedal will operate to swing the guide lever 19 about its pivot and this movement will be effective to operate, through the connections described between said guide lever and the axle sections, to tilt the axle and the framework diagonally and the share thus directed laterally in either direction.

While I have shown what I now consider to be the preferred form of the invention, it is obvious that mechanical changes may be made therein and equivalents substituted for the parts shown and I hereby reserve the right to make such mechanical changes and substitutions as may be found desirable within the scope of the principle of the invention.

What I claim is:

1. An implement of the character described including a beam whose rear end terminates in a downwardly turned stock, a share attached to said stock, a front and rear upstanding frame member secured to said beam, means anchoring said frame members together, an axle working in a bearing carried by the beam, said axle being divided to permit independent vertical movement of the wheels relative to each other and to the frame members, off-set spindles at the ends of the axle, ground wheels on said spindles, a transversely disposed guide lever pivotally mounted on the front frame member, means connected to the respective ends of said lever and to said axle through which the axle may be swung about the axis of said spindles to move said beam vertically.

2. An implement of the character described including a beam whose rear end terminates in a downwardly turned stock, a share attached to said stock, a front and rear upstanding frame member secured to said beam, means anchoring said frame members together, a divided axle working in a bearing carried by the beam, offset spindles at the ends of the axle, ground wheels on said spindles, a transversely disposed guide lever pivotally mounted on the front frame member, means connected to the respective ends of said lever and to said axle through which the axle may be swung about the axis of said spindles to move said beam vertically, and means for manually operating said axle swinging means.

3. An implement of the character described including a beam whose rear end terminates in a downwardly turned stock, a share attached to said stock, a front and rear upstanding frame member secured to said beam, means anchoring said frame members together, a sectional axle working in a bearing carried by the beam, offset spindles at the ends of the axle, ground wheels on said spindles, a transversely disposed guide lever pivotally mounted on the front frame member, means connected to the respective ends of said lever and to said axle through which the axle may be swung about the axis of said spindles to move said beam vertically, means for manually operating said axle moving means and means for locking said manual means against independent movement.

4. An implement of the character described including a beam having a bearing, a depending stock carried by the beam, a share attached to said stock, upstanding, connected frame members attached to said beam, a sectional axle working in said bearing and having transversely aligned offset spindles, ground wheels on said spindles, means connected to the axle and to the framework through which the axle may be swung about the axis of said spindles and the beam thereby elevated or lowered independently of each other and of the frame members.

5. An implement of the character described including a beam having a bearing, a depending stock carried by the beam, a share attached to said stock, upstanding frame members attached to said beam, a divided axle working in said bearing and having transversely aligned offset spindles, ground wheels on said spindles, means connected to the axle and to the frame members through which the axle may be swung about the axis of said spindles and the beam thereby elevated or lowered, manually operable means through which said axle moving means may be actuated and releasable means for locking said manually operable means against independent movement.

6. An implement of the character described including a beam having a bearing, a depending stock attached thereto, a share carried by the stock, upstanding frame members attached to the beam, a divided axle working in said bearing and having transversely aligned offset spindles, ground wheels on the spindles, a transverse guide lever pivotally mounted on one of the frame members, operative means on each side of the frame members connecting the axle with the corresponding end of said lever, and means through which said lever may be swung about its axis and said operative means thereby actuated to effect the movement of said axle.

7. An implement of the character described including a beam having a bearing, a depending stock attached thereto, a share carried by the stock, upstanding frame members attached to the beam, an axle working in said bearing and having transversely aligned offset spindles, ground wheels on the spindles, a transverse guide lever pivotally mounted on one of the frame members, operative means on each side of the frame members connecting the axle with the corresponding end of said lever, and means through which said lever may be swung about its axis and said operative means thereby actuated to effect the movement of said axle, said axle being formed of sections whose adjacent ends work in said beam bearing.

8. An implement of the character described including a beam having a bearing, a depending stock attached to said beam, a share carried by said stock, an axle formed of sections having adjacent ends in said bearing and whose other ends have transversely aligned offset spindles, ground wheels on said spindles, a transverse guide lever pivotally mounted on the implement, axle opering means on each side of the frame work and connecting the respective ends of said lever with the corresponding axle sections, and pedal operatable means for swinging said lever about its pivot.

In testimony whereof I have signed my name to this specification.

OTTO WENDT.